(12) United States Patent
Houser et al.

(10) Patent No.: US 10,181,366 B2
(45) Date of Patent: Jan. 15, 2019

(54) TAPE DISPENSING TOOL

(71) Applicant: TE CONNECTIVITY CORPORATION, Berwyn, PA (US)

(72) Inventors: Matthew Steven Houser, Jonestown, PA (US); Chadwick Alan Kerstetter, Richfield, PA (US); Christopher John Karrasch, Carlisle, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 60 days.

(21) Appl. No.: 15/430,696

(22) Filed: Feb. 13, 2017

(65) Prior Publication Data
US 2017/0278597 A1   Sep. 28, 2017

Related U.S. Application Data

(60) Provisional application No. 62/313,875, filed on Mar. 28, 2016.

(51) Int. Cl.
*H01B 13/012*   (2006.01)
*B65H 35/00*   (2006.01)
(Continued)

(52) U.S. Cl.
CPC ..... *H01B 13/01281* (2013.01); *B65B 13/025* (2013.01); *B65B 27/105* (2013.01);
(Continued)

(58) Field of Classification Search
CPC .......... H01B 13/01281; H01B 13/0036; H01B 13/22; H02G 3/31; B65H 35/0026; B65H 37/007
See application file for complete search history.

(56) References Cited

U.S. PATENT DOCUMENTS 4,574,023 A * 3/1986 Edwards ............... B65H 81/06
156/187
4,617,073 A * 10/1986 Scott ................... E06B 3/67343
156/107

(Continued)

FOREIGN PATENT DOCUMENTS

EP   0487303 A2   5/1992
EP   2157147 A2   2/2010
(Continued)

OTHER PUBLICATIONS

International Search Report, International Application PCT/IB2017/05169, International Filing Date Mar. 23, 2017.

*Primary Examiner* — Sean Michalski
*Assistant Examiner* — Fernando Ayala

(57) ABSTRACT

A tape dispensing tool includes a hub, a fixed holder arm, and an adjustable holder arm. The hub extends through a core of a roll of tape. The fixed holder arm extends from the hub along a first side of the roll of tape and has a fixed orientation relative to the hub. The fixed holder arm includes a first cradle configured to receive a cable bundle therein. The adjustable holder arm extends from the hub along an opposite, second side of the roll of tape. The adjustable holder arm includes a second cradle configured to receive the cable bundle therein. The adjustable holder arm has an adjustable position relative to the hub and the fixed holder arm to select an angular position of the second cradle relative to the first cradle for setting an overlap amount as the tape is applied to the cable bundle.

21 Claims, 9 Drawing Sheets

(51) Int. Cl.
     *B65H 37/00*     (2006.01)
     *H01B 13/00*     (2006.01)
     *H01B 13/22*     (2006.01)
     *B65B 13/02*     (2006.01)
     *B65B 27/10*     (2006.01)
     *H02G 3/32*     (2006.01)

(52) U.S. Cl.
     CPC ....... *B65H 35/0026* (2013.01); *B65H 37/007* (2013.01); *H01B 13/0036* (2013.01); *H01B 13/22* (2013.01); *H02G 3/32* (2013.01)

(56) References Cited

U.S. PATENT DOCUMENTS

| | | | | |
|---|---|---|---|---|
| 5,094,710 | A * | 3/1992 | Sokolovsky | B29C 53/043 156/461 |
| 5,174,850 | A * | 12/1992 | Stefan | B65H 35/0033 156/323 |
| 5,573,627 | A * | 11/1996 | Vuong | B65B 27/10 156/392 |
| 7,611,088 | B1 * | 11/2009 | Yu Chen | B65H 37/007 156/579 |
| 8,256,482 | B2 * | 9/2012 | Brosseau | B29C 63/105 156/185 |
| 8,622,440 | B2 * | 1/2014 | Crichton | B65B 13/26 289/1.5 |
| 9,242,832 | B2 * | 1/2016 | Word | B65H 81/02 |

FOREIGN PATENT DOCUMENTS

| | | |
|---|---|---|
| GB | 2174885 A | 11/1986 |
| WO | 9202417 A1 | 2/1992 |

\* cited by examiner

TAPE DISPENSING TOOL

CROSS-REFERENCE TO RELATED APPLICATIONS

This application claims priority to U.S. Provisional Application No. 62/313,875, filed 28 Mar. 2016, which is incorporated by reference in its entirety.

BACKGROUND OF THE INVENTION

The subject matter herein relates generally to tape dispensing tools.

In many manufacturing facilities, groups of bundles of electrical wires and/or cables are wrapped in a tape. The bundles are wrapped for various reasons, such as to organize a working space by tying all of the wires and/or cables in the bundle together and to provide abrasion resistance for the wires and/or cables in the bundle. For example, some complex manufactured products, such as automobiles, include many electrical wires and cables. Wrapping bundles of wires and/or cables in tape serves to organize and simplify routing of the wires and/or cables during the manufacturing process. Tape wrapping also protects the cable bundles during operation of the manufactured product, such as while the automobile is driven, from abrasions caused by the cable bundles contacting one another, other parts of the product, or environmental components, such as dirt and debris.

One known tape wrapping technique is manual wrapping, which involves a user manually swinging a roll of tape around a cable bundle along a length of the bundle. Manual wrapping is not without disadvantages, however, including quality control issues. For example, manual wrapping at an efficient rate with a consistent amount of overlap during each revolution of the roll of tape is difficult and requires a significant learning curve. Some automatic tape-wrapping tools have been developed to attempt to alleviate the quality control issues associated with manual wrapping, but the known automatic and manual-assist tools are not without disadvantages. Such known automatic and manual-assist tools are expensive and not user-friendly. For example, some such tools are heavy, have a cord that interferes with the operation, and/or vibrate during operation, which may be uncomfortable for the user. In addition, some automatic tools put tension on the cable bundle as the tape is wrapped around the bundle, which may damage the electrical connections at the ends of the wires and/or cables in the bundle.

A need remains for a tape dispensing tool that is user-friendly and is able to provide a consistent amount of overlap.

BRIEF DESCRIPTION OF THE INVENTION

In one embodiment, a tape dispensing tool is provided that includes a hub, a fixed holder arm, and an adjustable holder arm. The hub extends through a core of a roll of tape. The fixed holder arm extends from the hub along a first side of the roll of tape. The fixed holder arm has a fixed orientation relative to the hub. The fixed holder arm includes a first cradle configured to receive a cable bundle therein. The adjustable holder arm extends from the hub along an opposite, second side of the roll of tape. The adjustable holder arm includes a second cradle configured to receive the cable bundle therein. The adjustable holder arm has an adjustable position relative to the hub and the fixed holder arm to select an angular position of the second cradle relative to the first cradle for setting an overlap amount as the tape is applied to the cable bundle.

In another embodiment, a tape dispensing tool is provided that includes a hub, a fixed holder arm, and an adjustable holder arm. The hub extends through a core of a roll of tape. The fixed holder arm extends from the hub along a first side of the roll of tape. The fixed holder arm has a fixed orientation relative to the hub. The fixed holder arm includes a first cradle configured to receive a cable bundle therein. The adjustable holder arm extends from the hub along an opposite, second side of the roll of tape. The adjustable holder arm includes a second cradle configured to receive the cable bundle therein. The first and second cradles each include two wheels rotatable about two corresponding axles, the two wheels of each of the first and second cradles being spaced apart from one another and defining a cleft therebetween. The cable bundle being received at least partially into the clefts of the first and second cradles to engage both wheels of the respective first and second cradles. The adjustable holder arm has an adjustable position relative to the hub and the fixed holder arm to select an angular position of the second cradle relative to the first cradle for setting an overlap amount as the tape is applied to the cable bundle.

DETAILED DESCRIPTION OF THE INVENTION

One or more embodiments described herein disclose a tape dispensing tool that assists a user wrapping tape around a bundle of electrical wires and/or cables. As used herein, the term "cable bundle" is used broadly to represent a group of multiple electrical wires and/or cables, including a wire harness. Thus, electrical wires and cables are used interchangeably. A cable bundle may also include optical conductors, such as fiber optic cables, in addition to or instead of electrical cables. Cable bundles may be used in automobiles and other transportation vehicles, industrial machinery, household appliances, and the like.

The tape dispensing tool is configured to be rotated around the bundle of wires and/or cables, such that the tape dispensing tool is moved around a perimeter of the bundle to helically apply tape to the bundle. The tape dispensing tool is configured to provide a consistent amount of overlap of the tape as the tool revolves around the bundle, thus improving the quality of tape wrapping relative to known manual methods. The tape dispensing tool is adjustable such that the tool can be used with cable bundles of different diameters and can dispense the tape at a selected one of multiple different overlap amounts based on desired or required specifications.

Tape overlap amounts represent a fraction or percentage of a width of a previous loop of tape that is covered by a subsequent loop of the tape as the tape is helically wound around the cable bundle. For example, a 50% overlap covers or overlays half of the width of the previous loop of tape. A higher overlap amount may provide more protection for the cable bundle against abrasions and contaminants than a lower overlap amount, but also requires more tape and a longer duration to apply the tape. Overlap amounts may vary greatly, such as from 100% (which fully covers the previous loop) down to negative percentages. In negative percent overlaps, the cable bundle is exposed between subsequent loops of tape (sometimes referred to as candy cane style wrapping). The amount of overlap may be based on the application, such that a safety-related cable bundle (e.g., associated with an automobile airbag) may have a greater overlap amount than a non-safety-relate cable bundle (e.g., associated with an automobile seat-warmer).

The embodiments of the tape dispensing tool disclosed herein may be more user-friendly than known available automatic and manual-assist tape dispensing tools and machines. For example, the embodiments of the tape dispensing tool may have less weight and a more compact size than known taping tools. In addition, the embodiments of the tape dispensing tool may be less costly and easier to assemble and disassemble (for replacing rolls of tape) than the known taping tools. Furthermore, the embodiments of the tape dispensing tool may provide more accurate and consistent overlap than the known taping tools.

Figure 1:
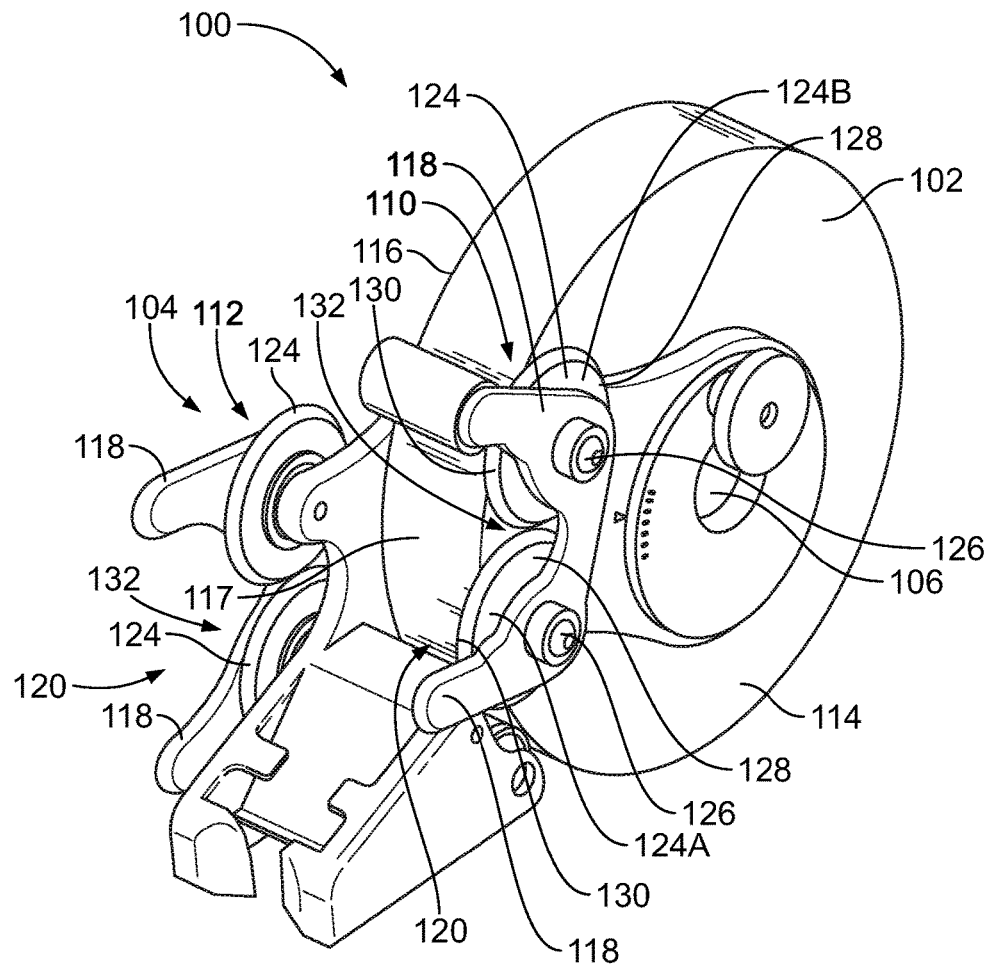
FIG. 1 is a side perspective view of a tape dispensing tool according to an embodiment.

FIG. 1 is a side perspective view of a tape dispensing tool 100 according to an embodiment. The tape dispensing tool 100 has a roll of tape 102 loaded on the tape dispensing tool 100. As used herein, the tape dispensing tool 100 may be referred to as tape dispenser 100. The roll of tape 102 may be an electrically insulative tape composed of vinyl and/or one or more plastics, such as electrical tape. The tape dispenser 100 includes a holder assembly 104 or housing that contains the roll of tape 102. The holder assembly 104 is configured to be held and manipulated by a user in order to wrap the tape helically along a length of a cable bundle 108 (shown in FIG. 2).

The holder assembly 104 includes a hub 106 that extends through a core (not shown) of the roll of tape 102. The holder assembly 104 also includes a first cradle 110 and a second cradle 112 that are each configured to receive a segment of the cable bundle 108 (shown in FIG. 2) therein. The first cradle 110 is located along a first side 114 of the roll of tape 102, and the second cradle 112 is located along an opposite, second side 116 of the roll 102. The cradles 110, 112 are disposed adjacent to, or radially outward of, an outer edge 117 of the roll of tape 102. Thus, a portion of tape extending from the roll 102 can be applied directly to the cable bundle 108 in the cradles 110, 112. In an embodiment, the first and second cradles 110, 112 each include two prongs 118 that define a respective passage 120 therebetween. The prongs 118 extend generally radially outward relative to the hub 106.

Figure 2:
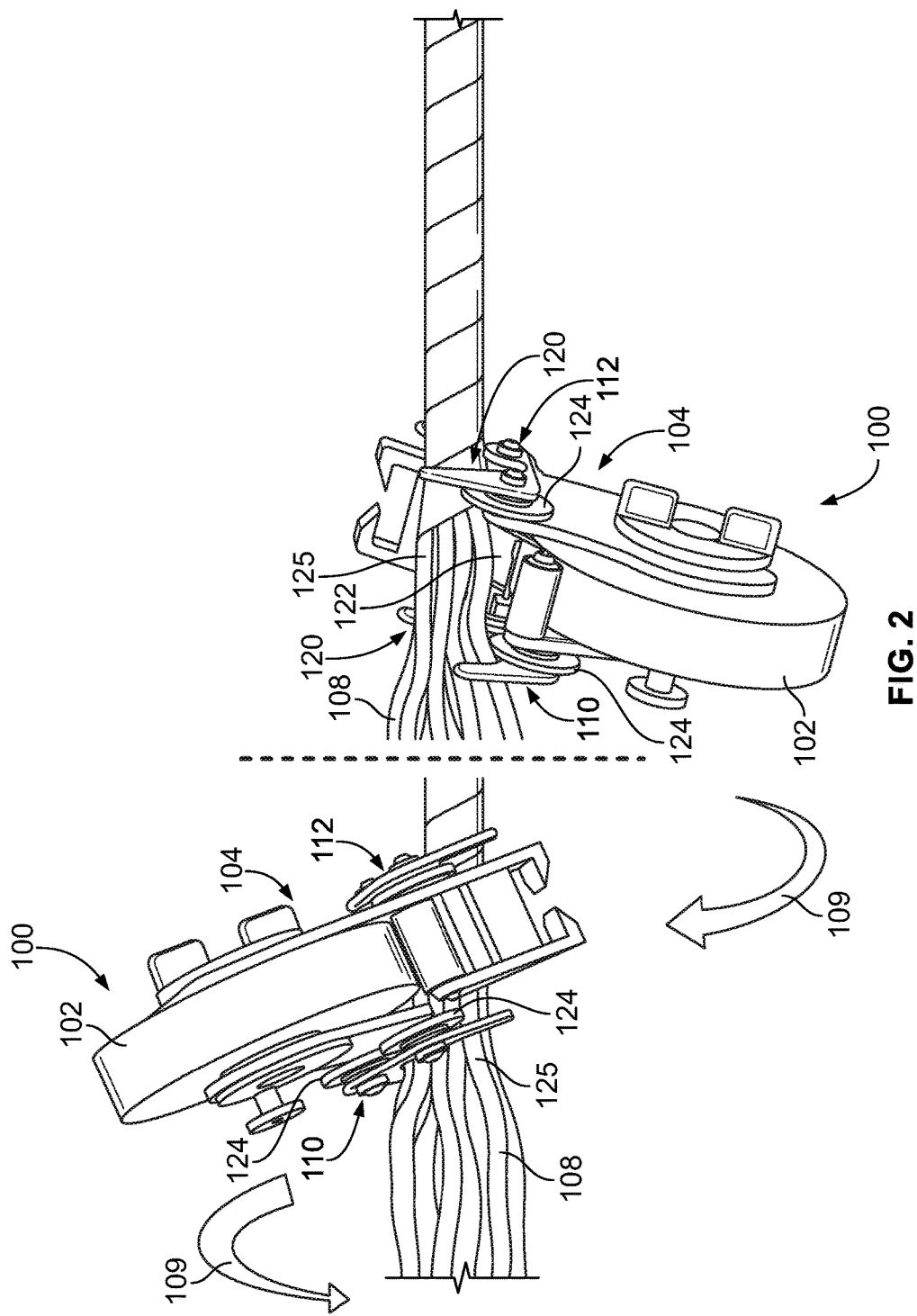
FIG. 2 shows the tape dispensing tool at two different positions relative to a cable bundle during a tape wrapping operation according to an embodiment.

Reference is now made to FIG. 2, which shows the tape dispenser 100 at two different positions relative to the cable bundle 108 during a tape wrapping operation according to an embodiment. The tape dispenser 100 may be rotated around the cable bundle 108 in a rotational direction 109 such that the tape is applied to the cable bundle 108 from right to left along a length. Thus, the position of the tape dispenser 100 in the right image occurs prior to the position shown in the left image. Alternatively, the tape dispenser 100 may be rotated in the opposite direction to apply the tape from left to right. In an embodiment, the tape is applied to the cable bundle 108 by loading the cable bundle 108 into the passages 120 of the cradles 110, 112 and attaching an end segment 122 of the tape to the cable bundle 108 such that an adhesive portion of the tape adheres to the cable bundle 108. Then, with the tape attached to the cable bundle 108 and the cable bundle 108 engaged with the first and second cradles 110, 112, the tape dispenser 100 is revolved around the perimeter of the cable bundle 108. The tape is wound around and applied to the cable bundle 108 as the tape dispenser 100 revolves around the cable bundle 108. In an embodiment, tension along the segment 122 of the tape that extends between the roll 102 and the cable bundle 108 holds the cradles 110, 112 in contact with the cable bundle 108 during the revolutions. Thus, in an embodiment, the tape dispenser 100 generally maintains contact with the cable bundle 108 along each revolution of the tape dispenser 100 due to the tension in the tape. The cradles 110, 112 "walk" (for example, slide or roll) along a perimeter surface 125 of the cable bundle 108.

Referring now back to FIG. 1, in an embodiment each of the cradles 110, 112 includes two wheels 124 that are rotatable about corresponding axles 126. The axles 126 may be pins, shafts, or fasteners that are coupled to the holder assembly 104, or alternatively may be rods or shafts that are integral to the holder assembly 104. The two wheels 124 of the first cradle 110 align in a common plane, such that a broad face 128 of one wheel 124A is coplanar with the broad face 128 of the other wheel 124B. The plane of the two wheels 124 may be parallel to a plane or orientation of the roll of tape 102, such that the roll 102 rotates along a plane parallel to the rotation of the wheels 124. The two wheels 124A, 124B of the first cradle 110 are spaced apart from each other. A radial outer edge 130 of the wheel 124A faces but does not contact the radial outer edge 130 of the other wheel 124B. The outer edges 130 of the two wheels 124A, 124B may be proximate to one another such that a relatively small clearance exists between the two outer edges 130 at a midpoint location along a straight line that extends between the two axles 126. The two wheels 124A, 124B define a cleft 132 between the outer edges 130 of the wheels 124A, 124B in the passage 120 between the prongs 118. The cleft 132 is generally V-shaped, with each side of the "V" defined by the convex curve of the outer edge 130 of one of the wheels 124A, 124B.

The second cradle 112 may be identical, or at least similar, to the first cradle 110, such that the second cradle 112 also defines a cleft 132 between the respective wheels 124 of the second cradle 112. The wheels 124 of the second cradle 112 align in a common plane that may be parallel to the plane of the wheels 124 of the first cradle 110 and/or the plane of the roll of tape 102. In an embodiment, at least a portion of the cable bundle 108 (shown in FIG. 2) is configured to be received in the clefts 132 of the first and second cradles 110, 112 to engage both wheels 124 of each of the cradles 110, 112 during the tape wrapping operation.

In one or more alternative embodiments, the first and second cradles 110 each include more or less than two wheels, such as one wheel or three wheels. Alternatively, one or both of the cradles 110, 112 may not include any wheels, such that the cable bundle 108 is configured to engage the prongs 118 and/or other stationary surfaces instead of rotating wheels. In another alternative embodiment, one or both of the cradles 110, 112 do not include the prongs 118. Instead of the prongs 118, the tape dispenser 100 may include a strap, a clamp, or another feature that extends around the cable bundle 108 to retain the cable bundle 108 within the cradles 110, 112.

Referring now to both FIGS. 1 and 2, the first cradle 110 is offset angularly from the second cradle 112. The cradles 110, 112 are offset from each other to allow the tape dispenser 100, when revolved around the perimeter of the cable bundle 108, to move axially along the length of the cable bundle 108. Such movement of the tape dispenser 100 applies the tape around the cable bundle 108 in a helical fashion. The relative angular position of the two cradles 110, 112 and the diameter of the cable bundle 108 affects the pitch and amount of overlap of the tape that is applied to the cable bundle 108. In an embodiment, the holder assembly 104 is adjustable to allow a user to select the relative angular position of the cradles 110, 112. By selecting the relative angular position, the user can set a desired overlap amount, such as 20% or 30% for example.

As shown in FIG. 2, the tape dispenser 100 is configured to "walk" along the length of the cable bundle 108 as the tape dispenser 100 is moved around the perimeter thereof. The cable bundle 108 engages both wheels 124 of each of the first and second cradles 110, 112, such that the tape dispenser 100 rolls along the perimeter surface 125 of the cable bundle 108. Since the cradles 110, 112 are offset angularly, the wheels 124 drive the tape dispenser 100 axially along the length of the cable bundle 108 as the tape dispenser 100 revolves, which provides the helical wrapping. As stated above, the tension in the segment 122 of the tape extending from the roll 102 holds the wheels 124 of the cradles 110, 112 in relatively constant engagement with the perimeter surface 125. In an alternative embodiment, the use of a clamp, a strap, or the like on the cradles 110, 112 maintains the wheels 124 in relatively constant engagement with the cable bundle 108. The wheels 124 steer the movement of the tape dispenser 100, which guides the application of the tape to the cable bundle 108.

The cradles 110, 112, including the wheels 124 thereof, allow the tape dispenser 100 to provide consistent amounts of overlap of the tape. The tape overlap may be more consistent than known manual and manual-assist taping techniques and devices. Thus, the tape dispenser 100 may provide better quality wrapping than the known manual and manual-assist taping techniques and devices. Furthermore, since the cradles 110, 112 are adjustable, the tape dispenser 100 is able to provide consistent overlap at different desired overlap amounts.

Figure 3:
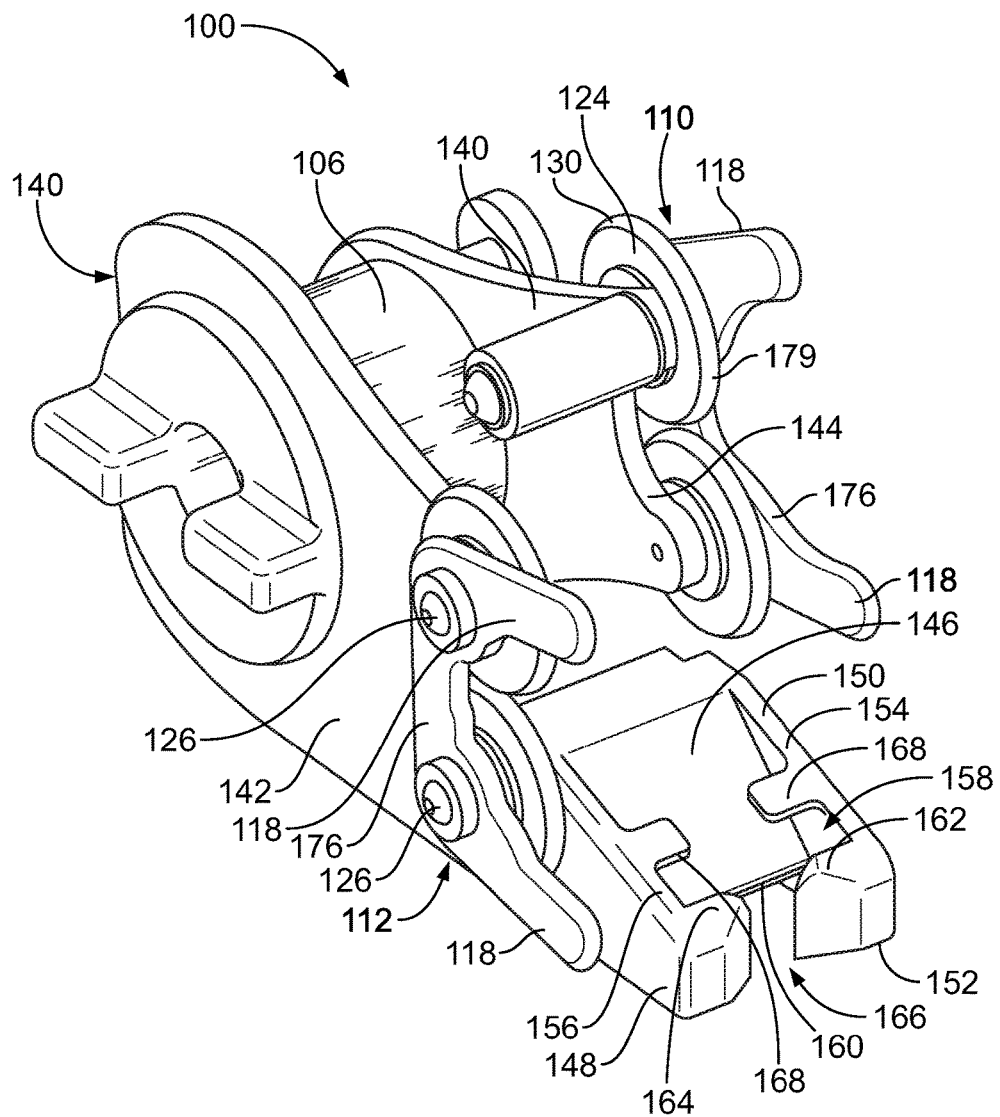
FIG. 3 is a side perspective view of the tape dispensing tool showing the other side of the tape dispensing tool relative to FIG. 1.

FIG. 3 is a side perspective view of the tape dispensing tool 100 showing the other side of the tape dispensing tool 100 relative to FIG. 1. In FIG. 3, the roll of tape 102 (shown in FIG. 1) is absent. In an embodiment, the holder assembly 104 includes a first holder arm 140 and a second holder arm 142 that both extend radially outward from the hub 106. The first cradle 110 is part of the first holder arm 140 and is located at a distal end 144 thereof. The distal end 144 is the portion of the first holder arm 140 that is farthest from the hub 106. The first cradle 110 may be integral to the first holder arm 140, coupled to the first holder arm 140, bonded or otherwise adhered to the first holder arm 140, or the like. In the illustrated embodiment, the wheels 124 and the prongs 118 of the first cradle 110 are separate components that are coupled to the first holder arm 140. The second cradle 112 is part of the second holder arm 142. The prongs 118 of each of the cradles 110, 112 are integral parts of respective U-shaped plates 176 that are coupled to the respective holder arms 140, 142 at the locations of the axles 126. Alternatively, the two prongs 118 of each cradle 110, 112 may be discrete parts. In an embodiment, the wheels 124 of the first and second cradles 110, 112 include a rubberized material along the outer edges 130 to provide enhanced grip on the cable bundle 108 (shown in FIG. 2), reducing slipping. The rubberized material may be rubber or a rubber-like polymer, for example. One example is an O-ring 179 that extends around the outer edge 130 of each wheel 124.

The first and second holder arms 140, 142 may be frame members that are coupled to the hub 106. In an alternative embodiment, at least one of the first or second holder arms 140, 142 may be formed integral to the hub 106 as a unitary, one-piece body that couples to the other holder arm. The first and second holder arms 140, 142 may be composed of a dielectric material, such as one or more plastics, and/or a conductive material, such as one or more metals. The holder arms 140, 142 may be molded or stamped and formed, for example. The first holder arm 140 in an embodiment is adjustable relative to the hub 106 such that the first holder arm 140 can be set in multiple positions and/or orientations relative to the hub 106 and the second holder arm 142. The second holder arm 142 may be non-adjustable relative to the hub 106 such that the second holder arm 142 has a fixed orientation and position relative to the hub 106. As used herein, the first holder arm 140 may be referred to as adjustable holder arm 140, and the second holder arm 142 may be referred to as fixed holder arm 142. In an alternative embodiment, the second holder arm 142 may be adjustable instead of, or in addition to the first holder arm 140.

In an embodiment, the fixed holder arm 142 further includes an applicator head 146 at a distal end 148 of the fixed holder arm 142. The applicator head 146 is disposed laterally between the first and second cradles 110, 112 such that the applicator head 146 aligns with the roll of tape 102 (shown in FIG. 1) on the hub 106. The applicator head 146 is configured to cut the tape and also to retain an exposed or extended segment of the tape to aid in starting a new tape-wrapping operation. In the illustrated embodiment, the applicator head 146 is formed integral to the fixed holder arm 142 as a unitary, one-piece component, but in other embodiments the applicator head 146 may be discrete from the fixed holder arm 142 and coupled or bonded to the holder arm 142.

The applicator head 146 has a top side 150 and an opposite bottom side 152. As used herein, relative or spatial terms such as "left," "right," "top," and "bottom" are only used to identify and distinguish the referenced elements and do not necessarily require particular positions or orientations relative to the surrounding environment of the tape dispenser 100. The applicator head 146 further includes first and second side walls 154, 156 that each extend between the top side 150 and the bottom side 152. The applicator head 146 defines a cavity 158 between the side walls 154, 156. The cavity 158 is generally open along the top side 150. A cutting blade 160 is held within the cavity 158. The cutting blade 160 is recessed from the top and bottom sides 150, 152 to prevent unintentional user contact with the blade 160. The first and second walls 154, 156 also include respective end wall segments 162, 164 that extend from the respective walls 154, 156 toward the opposing wall 156, 154. In the illustrated embodiment, the end wall segments 162, 164 are separated from one another to define a channel 166 therebetween. Although the end wall segments 162, 164 do not engage one another in FIG. 3, in an alternative embodiment the end walls segments 162, 164 may be joined such that the applicator head 146 has an end wall that extends between the side walls 154, 156, and the end wall defines a slot or channel that extends from the top side 150 towards, but not fully to, the bottom side 152. The applicator head 146 further includes retainer tabs 168 that extend from each of the side walls 154, 156 laterally inward towards the cavity 158. The retainer tabs 168 are located at or proximate to the top side 150. Any number of retainer tabs 168 may be used, and need not extend from both side walls 154, 156.

Figure 4:
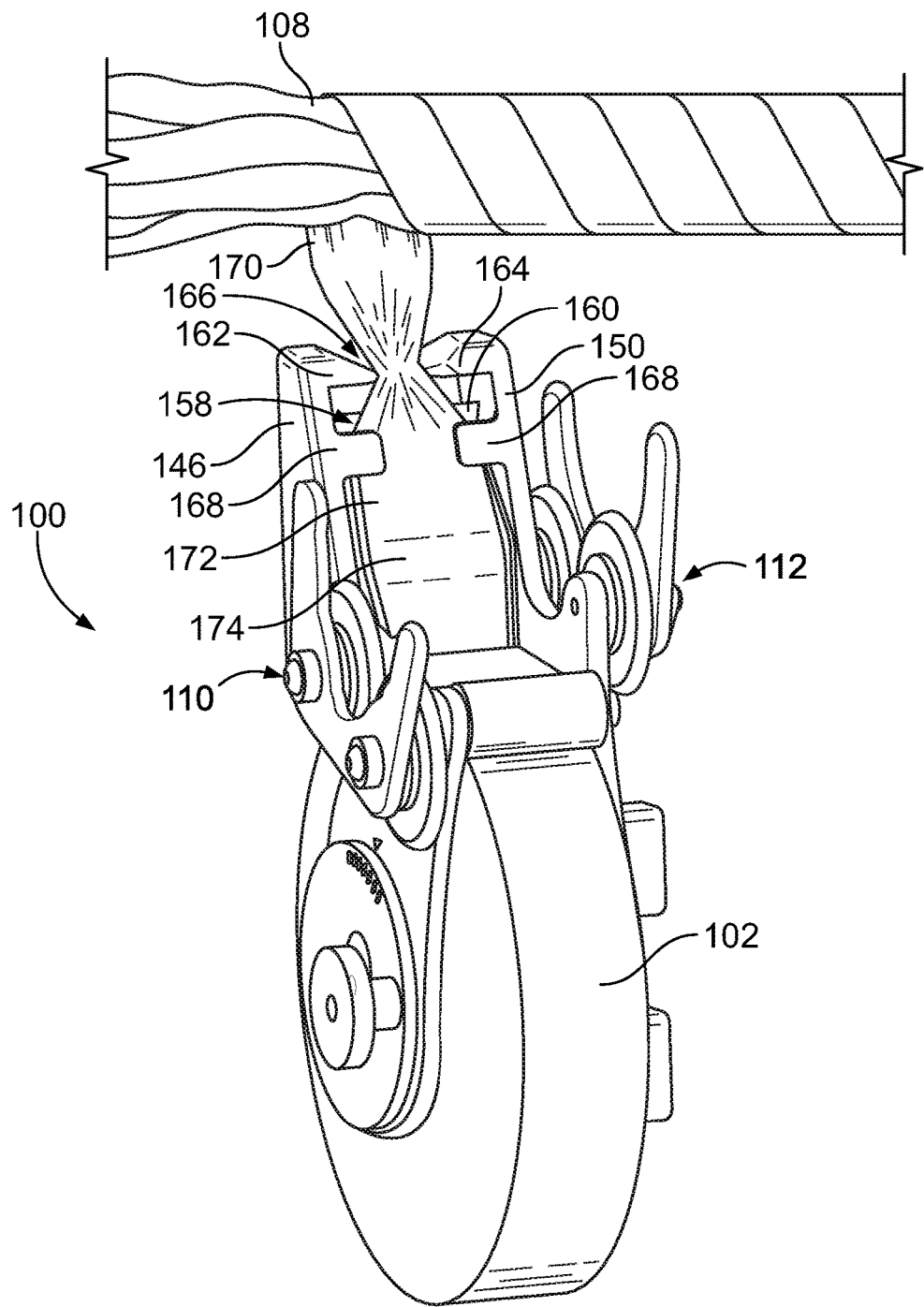
FIG. 4 is a perspective view of the tape dispensing tool connected to the cable bundle via an extended segment of tape according to an embodiment.

FIG. 4 is a perspective view of the tape dispenser 100 connected to the cable bundle 108 via an extended segment 170 of tape according to an embodiment. Once a designated length of the cable bundle 108 is wrapped, the applicator head 146 is used to break or split the tape to disconnect the tape dispenser 100 and roll of tape 102 thereon from the cable bundle 108. For example, the tape dispenser 100 is pulled away from the cable bundle 108 such that the bundle 108 is removed from the cradles 110, 112. The tape dispenser 100 is moved (for example, pivoted and/or translated) relative to the cable bundle 108 to cause the segment 170 of tape to enter the cavity 158 of the applicator head 146 through the top side 150. The segment 170 is pinched in the channel 166 between the end wall segments 162, 164. The extend segment 170 of tape is disposed under the retainer tabs 168 and above the cutting blade 160. In an embodiment, an adhesive side 172 of the extended segment 170 faces the retainer tabs 168. Further pivoting of the tape dispenser 100 relative to the cable bundle 108 causes the cutting blade 160 to cut and break the segment 170 of tape.

The portion of the extended segment 170 that extends from the blade 160 to the roll of tape 102 forms an end segment 174 that is retained at the applicator head 146 via the retainer tabs 168. For example, the adhesive side 172 of the end segment 174 within the cavity 158 contacts the retainer tabs 168 and adheres to the retainer tabs 168. The end segment 174 retained on the applicator head 146 assists in starting a subsequent wrapping operation as the end of the tape is easily accessible for a user without having to search for the end of the tape on the roll 102.

Figure 5:
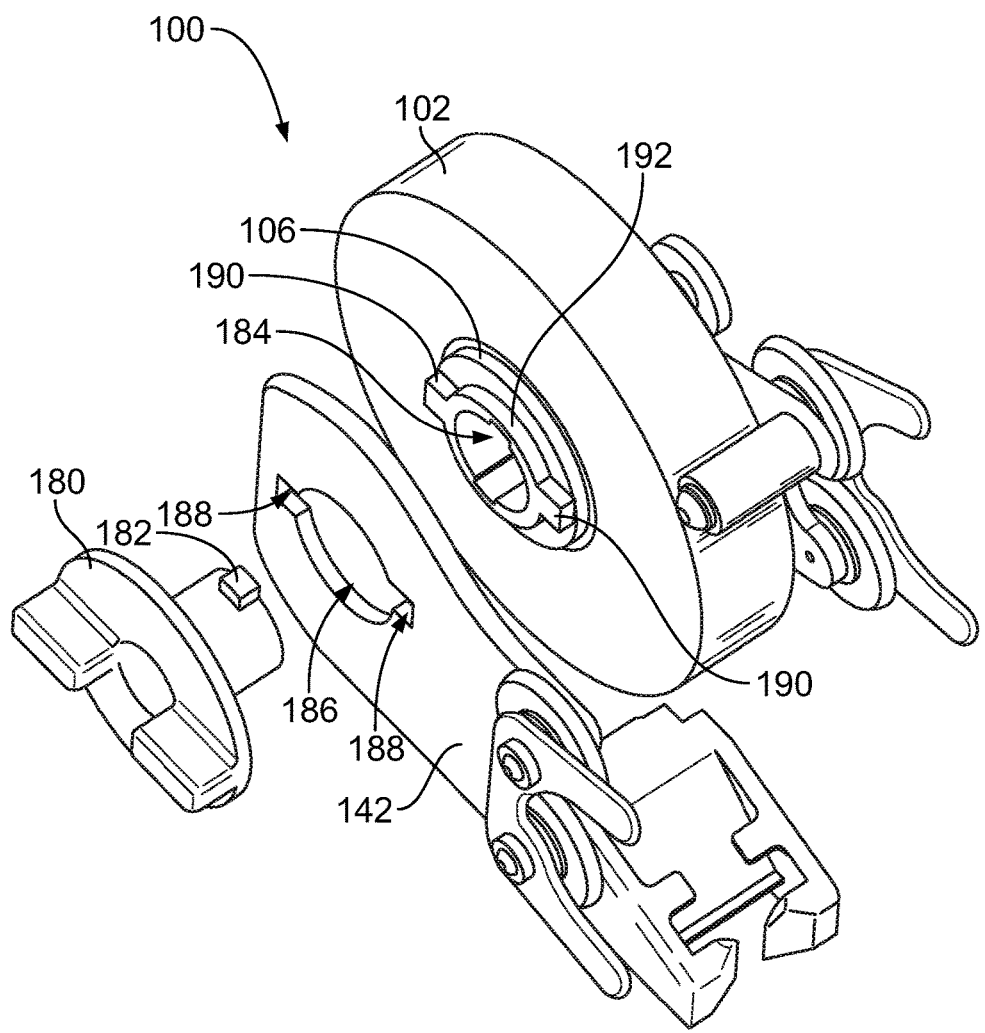
FIG. 5 is a partially exploded view of the tape dispensing tool according to an embodiment.

FIG. 5 is a partially exploded view of the tape dispenser 100 according to an embodiment. In an embodiment, the tape dispenser 100 includes a hub lock 180 that is configured to couple to the hub 106. The hub lock 180 is removable from the hub 106. When assembled to the hub 106, the hub lock 180 maintains the tape dispenser 100 in the assembled state and locks the roll of tape 102 on the hub 106. In order to remove the roll of tape 102, such as for replacing an empty roll, the hub lock 180 is removed from the hub 106, which allows the fixed holder arm 142 to be removed from the hub 106. The roll 102 is able to slide off of the hub 106 once the fixed holder arm 142 is removed. Thus, the hub lock 180 in the connected state secures the fixed holder arm 142 to the hub 106.

The hub lock 180 may be connected to the hub 106 via a bayonet coupling, helical screw threads, an interference fit, or the like. In the illustrated embodiment, the hub lock 180 includes at least one keying feature 182 that is configured to be received in a complementary inner keying feature 184 of the hub 106 in a bayonet-style coupling. Thus, rotating the hub lock 180 relative to the hub 106 (for example, 90 degrees) is used to secure and unsecure the hub lock 180 in the hub 106. The illustrated keying feature 182 is a protrusion and the illustrated inner keying feature 184 is a keyhole.

As shown in FIG. 5, the fixed holder arm 142 defines an opening 186 that receives a flange 192 of the hub 106 therein. The perimeter of the opening 186 includes at least one keying feature 188 that is configured to engage complementary outer keying features 190 of the flange 192 in order to properly orient the holder arm 142 relative to the hub 106 and to fix the holder arm 142 in place relative to the hub 106. The illustrated keying features 188 are slots of two different shapes and/or sizes, and the illustrated outer keying features 190 are tabs or protrusions of two different sizes. Due to the engagement of the keying features 188, 190, when the fixed holder arm 142 is mounted on the flange 192, the fixed holder arm 142 cannot rotate relative to the hub 106.

Figure 6:
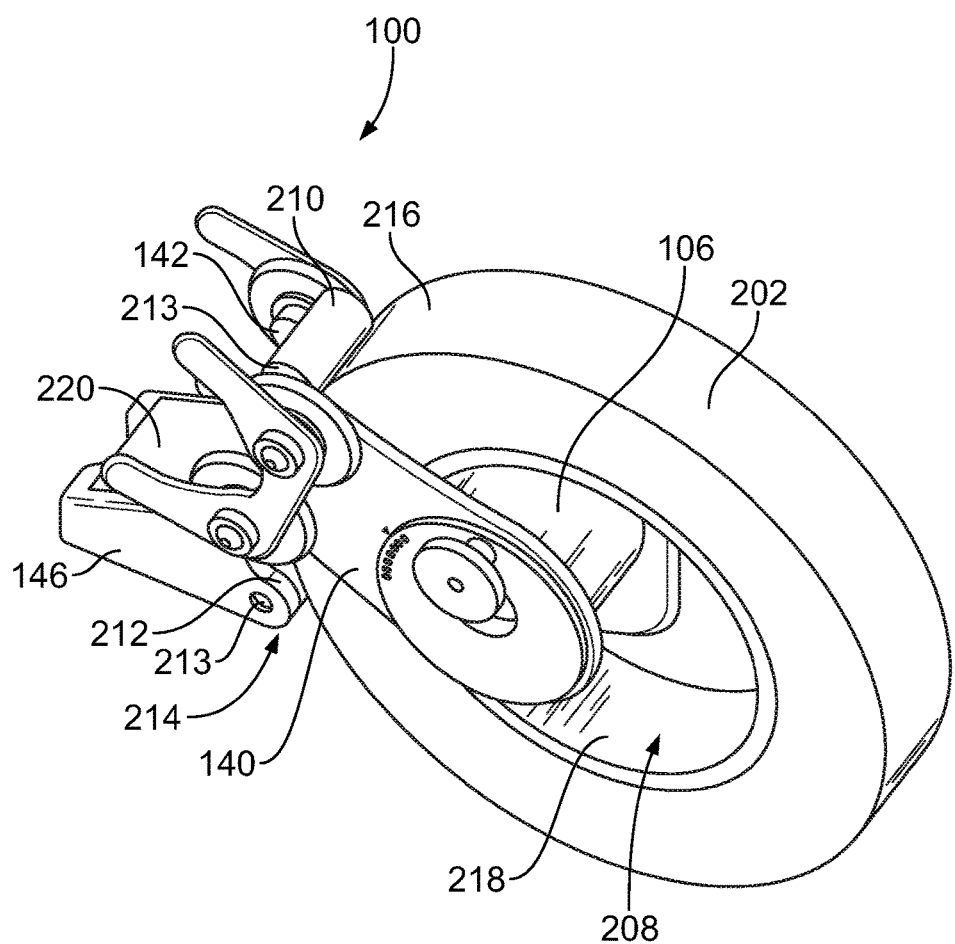
FIG. 6 is a side perspective view of the tape dispensing tool holding a roll of tape that has a large diameter core.

FIG. 6 is a side perspective view of the tape dispenser 100 holding a roll of tape 202 that has a large diameter core 208. The tape dispenser 100 is configured to accept tape rolls 202 of varying dimensions, such as various inner diameters, outer diameters, and/or thicknesses, without tool adjustments. For example, the tape dispenser 100 includes at least one guide roller extending from the adjustable holder arm 140 and/or the fixed holder arm 142 towards the other holder arm to align with the roll of tape 202. In the illustrated embodiment, the adjustable holder arm 140 includes an upper guide roller 210, and the fixed holder arm 142 includes a lower guide roller 212 that is located at a rear or proximal end 214 of the applicator head 146. Both guide rollers 210, 212 are rotatable on shafts or axles 213 relative to the respective holder arms 140, 142. Both guide rollers 210, 212 are configured to engage the roll of tape 202, such as along an outer edge (or outside surface) 216 of the tape 202 or along an extended segment 220 of tape that extends from the roll 202. The guide rollers 210, 212 are used to control the rotation of the roll of tape 202 relative to the tape dispenser 100.

As shown in FIG. 5, although the core 208 of the roll 202 has a large diameter, the guide rollers 210, 212 engage the outer edge 216 at two different circumferentially-spaced locations, and the hub 106 engages an inner edge 218 of the roller 202. The extended segment 220 of tape is fed or payed from the roll 202 at a location between the upper and lower guide rollers 210, 212. Optionally, the guide rollers 210, 212 and/or the hub 106 may include a rubberized material to enhance grip on the roll 202. The guide rollers 210, 212 may include a frictional material between the guide rollers 210, 212 and the respective shafts or axles 213 or may have a partial friction fit between the rollers 210, 212 and the shafts or axles 213 in order to provide some resistive force on the roll 202 of tape to prohibit the roll 202 from over-rotation.

Figure 7:
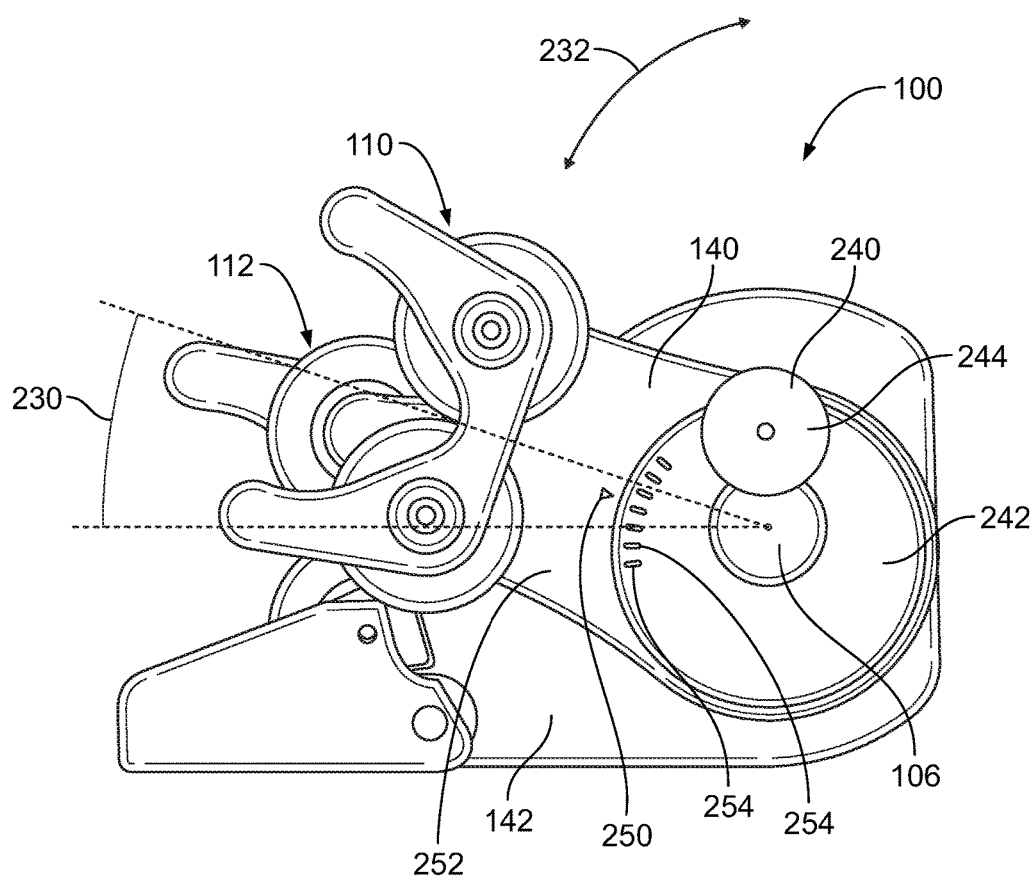
FIG. 7 is a side view of the tape dispensing tool according to an embodiment.

FIG. 7 is a side view of the tape dispenser 100 according to an embodiment. As stated above, the adjustable holder arm 140 is adjustable relative to the hub 106 and the fixed holder arm 142 in order to select an angular position of the first cradle 110 relative to the second cradle 112. The relative angular position of the cradles 110, 112 is used to set an amount of overlap during a tape-wrapping operation. The angular position represents a relative angle 230 between the cradles 110, 112. In the illustrated embodiment, the adjustable holder arm 140 is rotationally adjustable relative to the hub 106, such that the holder arm 140 is able to rotate along an arc 232 to select the angular position. The holder arm 140 may be adjustable along a range of angles, such as from 0 to 45 degrees relative to the fixed holder arm 142. Typically, for a given diameter of the cable bundle 108 (shown in FIG. 2), a larger angular position (or relative angle) results in a smaller amount of overlap as the tape is applied to the cable bundle because the larger angle increases the pitch of each revolution or loop around the cable bundle. Thus, to adjust the tape dispenser 100 to increase an amount of overlap, the user may rotate the holder arm 140 towards the fixed holder arm 142 to reduce the relative angle 230.

In an embodiment, the adjustable holder arm 140 includes one or more position markers 250 along an outer side 252 thereof. The position markers 250 indicate a value of the angular position 230 of the cradles 110, 112 relative to one another. The outer cover 242 in FIG. 7 also includes position markers 254, and the value of the angular position 230 is determined by comparing the position markers 254 of the outer cover 242 to the position markers 250 of the holder arm 140. For example, the position marker 250 on the holder arm 140 may be a reference indicator that points to one of multiple markers 254 on the outer cover 242 to determine the value. The position markers 250, 254 may have various shapes, colors, sizes, and indicia. For example, the markers 254 on the outer cover 242 may include different numbers and/or written text. Once the angular position 230 is known by comparing the markers 250, 254, a user can determine an overlap amount by consulting a database, for example, that provides overlap amounts based on the variables of cable bundle diameter and relative angle. Alternatively, the position markers 250, 254 may be calibrated for a designated diameter of cable bundle, and may provide values of the overlap amount instead of, or in addition to, providing values of the relative angle 230.

The holder arm 140 may be continuously adjustable such that the holder arm 140 can be positioned at any angle in the designated range, or discretely adjustable such that the holder arm 140 can be positioned in only designated angles, such as 2, 5, or 10 degree increments. In the illustrated embodiment, the adjustable holder arm 140 is continuously adjustable because the position of the holder arm 140 is set using a fastener, such as a thumb screw 240 that sets the holder arm 140 using friction. The thumb screw 240 extends through an outer cover 242 and a slot (not shown) of the holder arm 140 into engagement with the hub 106. The thumb screw 240 has a broad base 244 that is rotatable by the user to adjust the proximity of the base 244 to the outer cover 242 and the holder arm 140. For example, to secure the holder arm 140 at a selected position, the user rotates the thumb screw 240 to compress the outer cover 242 and/or the holder arm 140 against the hub 106. The holder arm 140 is released or loosened relative to the hub 106 for adjustment purposes by rotating the thumb screw 240 in the opposite direction. Although a thumb screw 240 is shown in FIG. 7, alternative embodiments may include a pin, a hub lock, fixed teeth, or the like, for setting and releasing the position of the adjustable holder arm 140.

For example, in one alternative embodiment, an outer surface of the hub 106 (for example, such as along a flange of the hub 106) engages an inner edge that defines an opening in the adjustable holder arm 140. Both the outer surface of the hub 106 and the inner edge of the holder arm 140 include fixed teeth that extend along the respective curves of the surfaces. The holder arm 140 is configured to be loaded onto the hub 106 such that the teeth along the inner edge of the opening engage and complement the teeth along the outer surface of the hub 106. The rotational position of the holder arm 140 is adjusted by loading the holder arm 140 at different angular positions relative to the hub 106 such that the teeth of the holder arm 140 are received between and engage different teeth of the hub 106 than at the previous position of the holder arm 140.

Figure 8:
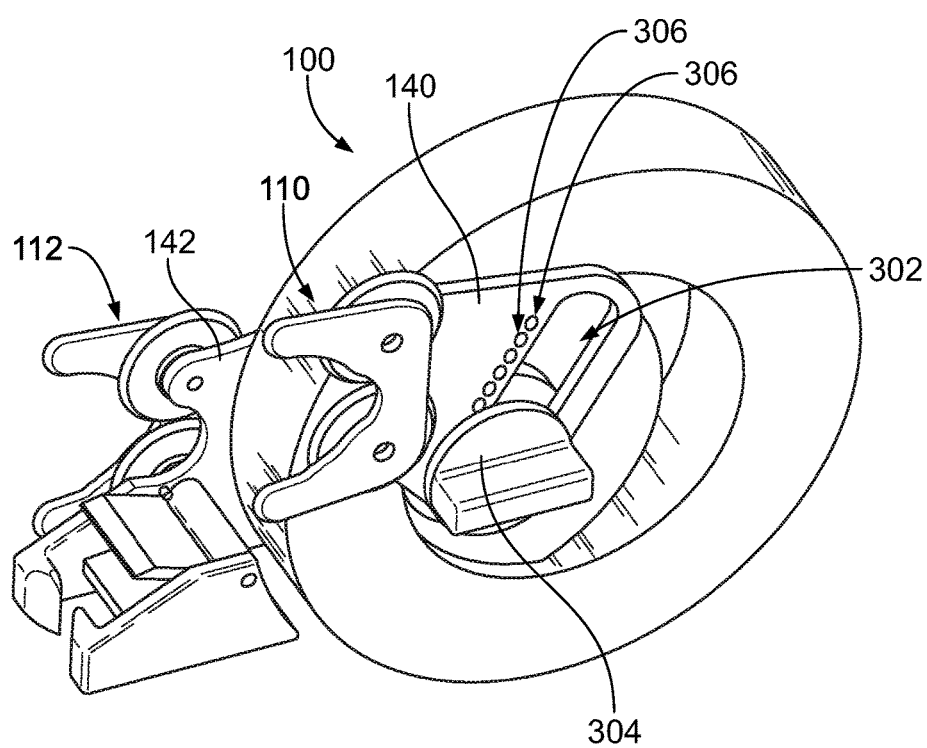
FIG. 8 is a perspective view of the tape dispensing tool according to an alternative embodiment.

FIG. 8 is a perspective view of the tape dispensing tool 100 according to an alternative embodiment. In FIG. 8, the angular positions of the first and second cradles 110, 112 are adjusted by moving the adjustable holder arm 140 linearly, not rotationally, relative to the hub (not shown) and the fixed holder arm 142. For example, the adjustable holder arm 140 defines an indexing slot 302 that receives a post of the hub or a locking fastener, such as a hub lock 304, therethrough. The holder arm 140 is configured to slide relative to the post along the path defined by the indexing slot 302 to alter the angular position of the first cradle 110 relative to the second cradle 112. In the illustrated embodiment, the indexing slot 302 is linear, such that the holder arm 140 slides linearly during the adjustment, but the slot 302 may be curved in other embodiments. Optionally, the holder arm 140 further defines locking holes 306 that are configured to receive a pin or post (not shown) of the hub lock 304 therein to secure the position of the holder arm 140. As an alternative to the locking holes 306, the holder arm 140 may be secured via interference or friction applied on the holder arm 140 by the hub lock 304 as the hub lock 304 is tightened to the hub.

Figure 10:
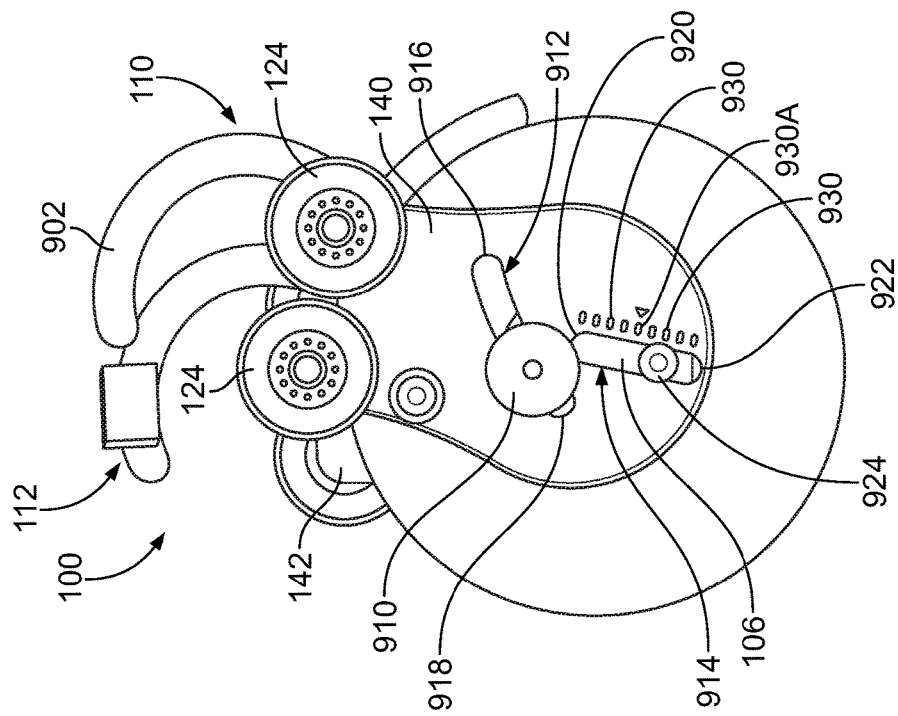
FIG. 10 is a side view of the tape dispensing tool shown in FIG. 9.
Figure 9:
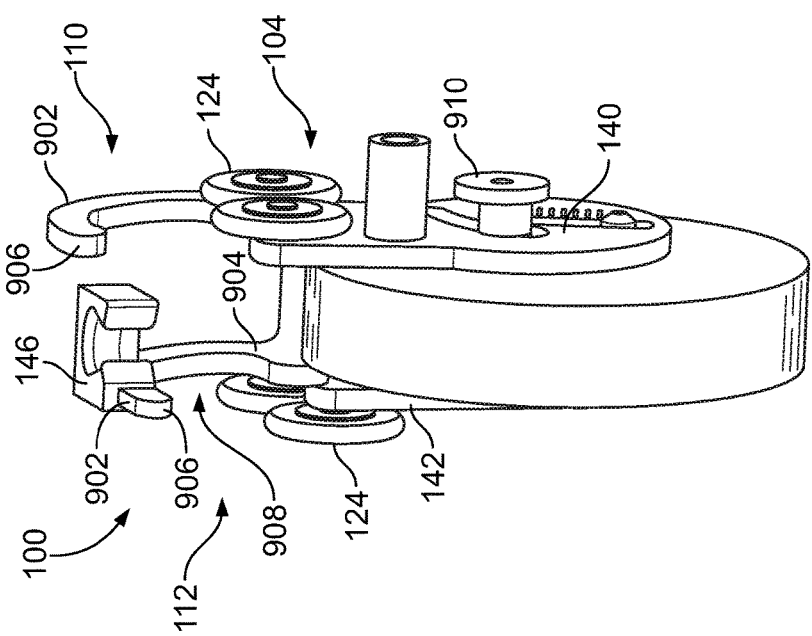
FIG. 9 is a perspective front view of the tape dispensing tool according to another alternative embodiment.

FIG. 9 is a perspective front view of the tape dispensing tool 100 according to another alternative embodiment. FIG. 10 is a side view of the tape dispensing tool 100 shown in FIG. 9. Referring first to FIG. 9, the cradles 110, 112 of the tape dispensing tool 100 each have a single hook 902 as opposed to the two prongs 118 shown in FIG. 1. The hooks 902 are curved and each extends from a fixed end 904 to a distal, free end 906. The hooks 902 have similar shapes as each other and each extends in a forward direction from the respective fixed end 904 to the respective distal end 906. The cradles 110, 112 are configured to receive the cable bundle 108 (shown is FIG. 2) through a passage 908 at the front of the tool 100 defined vertically between the distal ends 906 of the hooks 902 and the wheels 124.

In the illustrated embodiment, the applicator head 146 is mounted to the hook 902 of the fixed holder arm 142. The applicator head 146 is located proximate to the distal end 906 of the hook 902. The applicator head 146 is not coupled to the hook 902 or any other portion of the adjustable holder arm 140. In an alternative embodiment, the applicator head 146 is mounted to the hook 902 of the adjustable holder arm 140 instead of the fixed holder arm 142. In an embodiment, the adjustable holder arm 140 is coupled to the fixed holder arm 142 and the hub 106 of the tape dispensing tool 100 via an interference fit and a fastener 910. The fastener 910 may be a cap that is pressed onto a post (not shown) of the hub 106 or the fixed holder arm 142 and held on the post via an interference fit. Alternatively, the fastener 910 may be a thumb screw or another type of fastener. The fastener 910 provides structural support for the holder assembly 104 of the tool 100, and also retains an orientation and position of the adjustable arm 140 relative to the fixed arm 142. Although the illustrated embodiment of the tape dispensing tool 100 lacks guide rollers, the tape dispensing tool 100 optionally may include one or more guide rollers that extend from one of the holder arms 140, 142 across the roll of tap towards the other holder arm 140, 142 to engage the tape, similar to the guide rollers 210, 212 shown in FIG. 6.

Referring now to FIG. 10, the adjustment of the adjustable holder arm 140 relative to the hub 106 and the fixed holder arm 142 is accomplished using first and second indexing slots 912, 914 defined in the adjustable holder arm 140. The first indexing slot 912 extends from a first end 916 to a second end 918. The second indexing slot 914 extends from a first end 920 to a second end 922. The slots 912, 914 act as guide tracks for corresponding posts extending from the hub 106 or the fixed holder arm 142. For example, a post (not shown) extends through the first slot 912 and is engaged by the fastener 910. Alternatively, the fastener 910 may define the post that extends through the first slot 912 into a hole in the hub 106. A post 924 extends from the hub 106 or the fixed arm 142 through the second slot 914.

The two slots 912, 914 define different paths that are transverse to one another. In the illustrated embodiment, the first slot 912 is curved, and the second slot 914 is linear. The first slot 912 is located vertically above the second slot 914, such that the first slot 912 is located vertically between the second slot 914 and the hook 902. The adjustable arm 140 is adjusted by moving the arm 140 relative to the post 924 and the fastener 910, such that the slot 914 moves relative to the post 924 and the slot 912 moves relative to the fastener 910. Since the slots 912, 914 have transverse paths, the adjustable arm 140 is able to move along a compound trajectory relative to the hub 106 and the fixed arm 142. For example, forcing the adjustable arm 140 to move vertically upwards relative to the post 924 (e.g., such that the end 922 of the slot 914 approaches the post 924) also results in the adjustable arm 140 pivoting or rotating clockwise relative to the fixed arm 142 as the end 918 of the first slot 912 approaches the fastener 910. Therefore, the adjustable arm 140 is configured to both translate and pivot as the arm 140 is adjusted relative to the fixed arm 142 and the hub 106. Furthermore, forcing the arm 140 to move vertically downwards relative to the post 924 results in the arm 140 also pivoting counter-clockwise relative to the fixed arm 142 due to the curved slot 912 moving relative to the fastener 910. In an alternative embodiment, the first slot 912 is linear and the second slot 914 is curved, both slots 912, 914 are curved, or both slots 912, 914 are linear.

The embodiment of the tape dispensing tool 100 shown in FIGS. 9 and 10 is designed to allow for taping in either axial direction along a cable bundle (e.g., the cable bundle 108 shown in FIG. 2) without causing the tape to bunch by setting the position of the adjustable arm 140. For example, the adjustable arm 140 includes multiple position markers 930 located adjacent to the second slot 914 along the length thereof. The position markers 930 include a central marker 930A that indicates a midpoint of the slot 914. In an embodiment, when the post 924 aligns with the central marker 930A, the adjustable arm 140 aligns, both angularly and translationally, with the fixed arm 142. Setting the adjustable arm 140 such that the post 924 aligns with the central marker 930A results in a 100% overlap amount, and this setting may be used for spot taping operations. In the illustrated embodiment, the post 924 aligns with a marker 930 that is below the central marker 930A (e.g., between the central marker 930A and the end 922 of the slot 914). In this orientation, the cradle 110 (including the hook 902 and the wheels 124) of the adjustable arm 140 is positioned vertically above the cradle 112 of the fixed arm 142 and is angularly offset in a clockwise direction from the cradle 112, which is used for taping in one axial direction (e.g., right to left) when the tool 100 is revolved counter-clockwise around the cable bundle. When the adjustable arm 140 is adjusted such that the post 924 is located between the central marker 930A and the end 920 of the slot 914, the cradle 110 will be located vertically below the cradle 112 and angularly offset in the counter-clockwise direction from the cradle 112, which is used for taping in an opposite axial direction (e.g., left to right) when the tool 100 is revolved counter-clockwise around the cable bundle. In the illustrated embodiment, the tape dispensing tool 100 can be used for providing multiple different tape overlap amounts in a left-to-right axial direction along a cable bundle, multiple different tape overlap amounts in a right-to-left axial direction along the cable bundle, and also spot taping with 100% overlap by setting the position of the adjustable holder arm 140.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A tape dispensing tool comprising:
   a hub extending through a core of a roll of tape;
   a fixed holder arm extending from the hub along a first side of the roll of tape, the fixed holder arm having a fixed orientation relative to the hub, the fixed holder arm including a first cradle configured to receive a cable bundle therein; and
   an adjustable holder arm extending from the hub along an opposite, second side of the roll of tape, the adjustable holder arm including a second cradle configured to receive the cable bundle therein, the adjustable holder arm having an adjustable position relative to the hub and the fixed holder arm to select an angular position of the second cradle relative to the first cradle for setting an overlap amount as the tape is applied to the cable bundle.

2. The tape dispensing tool of claim 1, wherein each of the first and second cradles includes at least one of a hook or a set of prongs that define a passage configured to receive the cable bundle therein.

3. The tape dispensing tool of claim 1, wherein each of the first and second cradles includes two wheels rotatable about two corresponding axles, the two wheels of each of the first and second cradles aligning in a common plane and being spaced apart from one another, the cable bundle being received at least partially into a cleft defined between the two wheels of each of the first and second cradles to engage both wheels of the respective first and second cradles.

4. The tape dispensing tool of claim 3, wherein the wheels of the first and second cradles include a rubberized material along an outer edge of the corresponding wheel.

5. The tape dispensing tool of claim 3, wherein the two wheels of the first cradle are aligned in a first plane and the two wheels of the second cradle are aligned in a second plane that is parallel to the first plane.

6. The tape dispensing tool of claim 1, wherein the adjustable holder arm is selectively fixed in the adjustable position relative to the hub and the fixed holder arm via a fastener.

7. The tape dispensing tool of claim 1, wherein the adjustable holder arm defines an indexing slot that receives a post of at least one of the hub or a fastener therethrough, the adjustable holder arm being moveable relative to the hub and the fixed holder arm along a path defined by the indexing slot to adjust the angular position of the second cradle relative to the first cradle.

8. The tape dispensing tool of claim 7, wherein the indexing slot is a first indexing slot and the post is a first post, the adjustable holder arm further defining a second indexing slot that is spaced apart from the first indexing slot and receives a second post therethrough, the path defined by the first indexing slot transverse to a path defined by the second indexing slot, the adjustable holder arm being moveable relative to the hub and the fixed holder arm along the paths defined by the first and second indexing slots.

9. The tape dispensing tool of claim 1, wherein the fixed holder arm includes an applicator head disposed laterally between the first and second cradles and aligning with the roll of tape, the applicator head including first and second side walls that define a cavity therebetween and a cutting blade disposed in the cavity, the first and second side walls including respective end wall segments that define a channel therebetween, the channel receiving a segment of the tape therethrough to engage the cutting blade in the cavity.

10. The tape dispensing tool of claim 1, wherein the fixed holder arm includes an applicator head disposed laterally between the first and second cradles and aligning with the roll of tape, the applicator head including first and second side walls that define a cavity therebetween, the first and second side walls each including a retainer tab extending from the respective side wall into the cavity towards the other side wall, the retainer tabs configured to engage an adhesive side of a segment of the tape to hold the segment at the applicator head.

11. The tape dispensing tool of claim 1, wherein the adjustable holder arm includes one or more position markers along an outer side thereof, the one or more position markers indicating a value of the angular position of the second cradle relative to the first cradle.

12. The tape dispensing tool of claim 1, wherein at least one of the fixed holder arm or the adjustable holder arm holds a guide roller that extends across the roll of tap and is rotatable relative to the respective holder arm, the guide roller configured to engage the tape.

13. A tape dispensing tool comprising:
a hub extending through a core of a roll of tape;
a fixed holder arm extending from the hub along a first side of the roll of tape, the fixed holder arm having a fixed orientation relative to the hub, the fixed holder arm including a first cradle configured to receive a cable bundle therein; and
an adjustable holder arm extending from the hub along an opposite, second side of the roll of tape, the adjustable holder arm including a second cradle configured to receive the cable bundle therein, the first and second cradles each including two wheels rotatable about two corresponding axles, the two wheels of each of the first and second cradles being spaced apart from one another and defining a cleft therebetween, the cable bundle being received at least partially into the clefts of the first and second cradles to engage both wheels of the respective first and second cradles, the adjustable holder arm having an adjustable position relative to the hub and the fixed holder arm to select an angular position of the second cradle relative to the first cradle for setting an overlap amount as the tape is applied to the cable bundle.

14. The tape dispensing tool of claim 13, wherein the tape is applied to the cable bundle in the first and second cradles by revolving the tape dispensing tool around a perimeter of the cable bundle, tension along a segment of the tape extending between the roll of tape and the cable bundle holding the wheels of the first and second cradles in engagement with the cable bundle as the tape dispensing tool is rotated.

15. The tape dispensing tool of claim 13, wherein a larger angular position of the second cradle relative to the first cradle results in a smaller overlap amount as the tape is applied to the cable bundle.

16. The tape dispensing tool of claim 13, wherein the wheels of the first and second cradles include a rubberized material along an outer edge of the corresponding wheel.

17. The tape dispensing tool of claim 13, wherein the two wheels of the first cradle are aligned in a first plane and the two wheels of the second cradle are aligned in a second plane, the first plane parallel to the second plane.

18. The tape dispensing tool of claim 13, wherein the fixed holder arm includes an applicator head disposed laterally between the first and second cradles and aligning with the roll of tape, the applicator head having a top side and a bottom side and defining a cavity therein, the applicator head including a cutting blade in the cavity between the top side and the bottom side, the application head further including retainer tabs along the top side, the retainer tabs configured to engage an adhesive side of a segment of the tape to hold the segment at the applicator head.

19. The tape dispensing tool of claim 13, wherein the adjustable holder arm is at least one of linearly slidable relative to the hub along an indexing slot of the adjustable holder arm or rotationally pivotable about the hub to select the angular position of the second cradle relative to the first cradle.

20. The tape dispensing tool of claim 13, wherein each of the first and second cradles includes a hook that curves forward from a fixed end of the hook attached to the respective holder arm to a distal end, the cable bundle being received in a passage defined vertically between the distal ends of the hooks and the respective wheels of the first and second cradles.

21. The tape dispensing tool of claim 13, wherein the adjustable holder arm defines a first indexing slot and a second indexing slot that is spaced apart from the first indexing slot, the first indexing slot extending along a path transverse to a path along which the second indexing slot extends, the first and second indexing slots receiving corresponding first and second posts therethrough that are coupled to the hub, the adjustable holder arm being moveable relative to the hub and the fixed holder arm along the paths defined by the first and second indexing slots.

* * * * *